J. R. WHITTEMORE.
Straw Cutter.
No. 42,892.
Patented May 24, 1864.
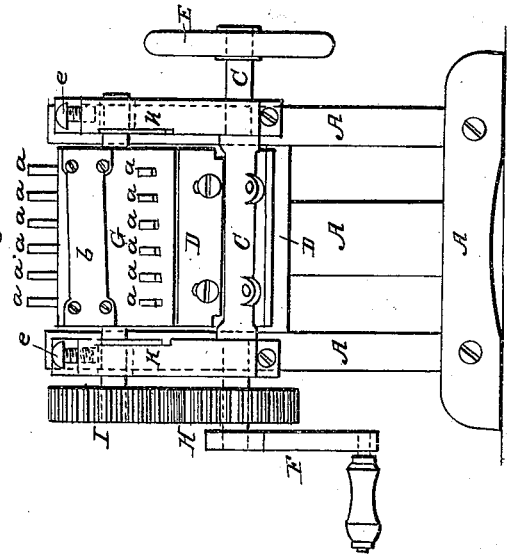
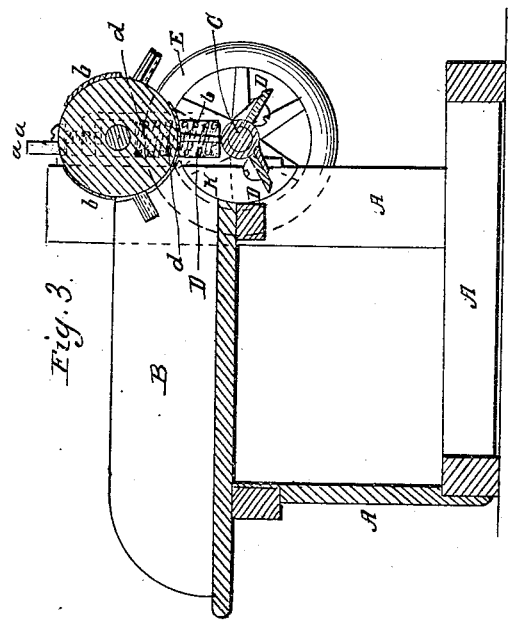
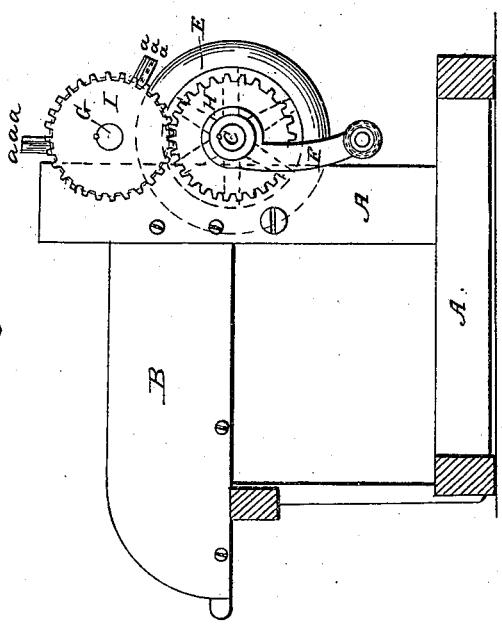
Witnesses:
Inventor:

United States Patent Office.

JOHN R. WHITTEMORE, OF CHICOPEE FALLS, MASSACHUSETTS.

STRAW-CUTTER.

Specification forming part of Letters Patent No. 42,892, dated May 24, 1864.

*To all whom it may concern:*

Be it known that I, JOHN R. WHITTEMORE, of Chicopee Falls, in the county of Hampden and State of Massachusetts, have invented a new and useful Improvement in Hay, Straw, and Feed Cutters; and I do hereby declare that the following is a full, clear, and exact description of the same, reference being had to the accompanying drawings, making a part of this specification.

Much ingenuity has been expended to produce the best rotary cutter for hay, straw, &c., and, as it is an article of universal use, the constant endeavor has been to make a good article for a small amount of money. Probably one of the first rotary cutters ever made was constructed with a cylinder of knives cutting against a pressure-roll of rawhide; but it was necessary to use a great number of knives on the cutting-cylinder in order to catch the hay before it would spring back, and, in order to dispense with so many knives, and thereby save greatly in expense, it was found that some extra arrangement was necessary to feed the hay to the cutters, as when cut off the hay in the feed-box would spring back out of reach of the next knife. To overcome this a spring bottom-board with a partial top covering has been used, or something accomplishing substantially the same object. Of course, all this makes an additional expense, balancing in a great part the saving made in dispensing with a portion of the knives; and, further, the hide-rolls are very expensive, and consequently something else equally as good is very desirable. Also, cutters have been made having a series of flanges on the upper shaft, these flanges being provided with some suitable material for the knives to cut against. The inventor of this claimed that it was necessary to have the flanges (or what produced the flanges—viz., the spaces between them) in order to allow the hay to feed into the knives. Now, I have found by experiment that with my present arrangement a full cylinder is equally as good as an open cylinder—that is, a shaft with flanges to cut against.

I claim to have so constructed the several parts that the greatest economy is obtained in the manufacture, and at the same time the operation is equally as satisfactory.

In the drawings making a part of this specification, Figure 1 is a side elevation of my cutter; Fig. 2, a front elevation, and Fig. 3 a longitudinal section.

A is the frame supporting the machine.

B is the box or trough for the hay or straw.

C is a knife-shaft provided with the knives D D D.

E is a balance-wheel on said knife-shaft.

F is a crank by which power is communicated to said knife-shaft.

G is a pressure-roll.

*a a a a a* are pins in roll G for feeding the hay or straw to the knives.

*b b b* are pieces of suitable soft metal attached to the face of the cylinder or roll G for the knives to cut against. As here shown, the pieces *b b b* are screwed onto the face of the roll G. They may be so arranged, or may be let into the roll, so as to form a continuous surface with that of the roll.

H and I are gears on the shaft C and G by which motion is communicated from the driving-shaft C to the pressure-roll G.

K K are supports or boxes for the bearings of the knife-cylinder C and pressure-roll G.

*d d* are spiral springs to support the pressure-roll G.

*e e* are set-screws to hold the pressure-roll G in contact with the knives D D D.

The gears H and I have the same number of teeth in each, and without such gears the arrangement above described would not operate, as the knives would be liable to cut on any portion of the roll G, and consequently would come in contact with the pins *a a a a a.*

Gears have before been used on cutters in this manner, but generally in combination with a top cylinder of such construction that the knife must always cut on the same place, and, consequently, the knife would cut or wear a groove in the face of the cylinder, or whatever surface it cut in, and when so worn the machine must be repaired or thrown aside. Now, by the use of a cylinder, G, having merely the pins *a a a a a,* I overcome this difficulty, for the pins are so small that there is sufficient space between the rows, so that the relative position of the two rolls may be changed by mismatching the gear-teeth, thus making the knife cut in a number of places on the cutting-piece *b,* and the number of changes is only limited by the width of the pieces *b b b,* which, if desirable, may be made to cover nearly the whole distance between the rows of pins.

Thus it is evident that the machine will wear many times as long as one that cannot be changed.

The feeding arrangement is simple and operates as follows: As one knife makes its cut the next knife is coming up from below, and also the pins $a$ $a$ $a$ $a$ are coming down from above in such a manner as to catch the hay or feed before it can spring back after being cut, and thus as the shafts rotate the hay is taken by the pins, which penetrate it, and carried forward for another cut.

I make the pressure-roll G of iron or wood and attach the pieces $b$ $b$ $b$ to it in order to save in the cost, that would be necessary to make the whole roll of a metal suitable for knives to cut against, as the knives cutting against an iron cylinder would soon become dull, and wood would not be durable enough.

Now, having fully described the construction and operation of my invention, I do not claim a cutter in which the rotary knives cut against a plain roll, whether made of rawhide or other substance or substances, when used without gears. Neither do I claim any combination with a flanged pressure-cylinder by which the knives cut against the faces of the flanges, or by the edges in a shearing manner, as these have been made and in some cases patented heretofore; but What I do claim as new, and desire to secure by Letters Patent, is—

The combination of the rotary knives D D D and gears H and I with a pressure-cylinder, (against which the knives cut,) having the pins $a$ $a$ $a$ arranged so as to work intermediately between the knives, for the purpose of feeding the hay or straw to the knives, substantially in the manner herein set forth.

JOHN R. WHITTEMORE.

Witnesses:
MILTON BRADLEY,
J. B. GARDINER.